United States Patent [19]

Reed et al.

[11] Patent Number: 5,084,207
[45] Date of Patent: Jan. 28, 1992

[54] LIQUID COMPOSITION FOR CONTROLLING DUST MIGRATION

[76] Inventors: Jeffrey Reed; Wendell Reed, both of P.O. Box 3191, Modesto, Calif. 95354

[21] Appl. No.: 480,725

[22] Filed: Feb. 16, 1990

Related U.S. Application Data

[63] Continuation of Ser. No. 177,156, Apr. 4, 1988, abandoned, and a continuation-in-part of Ser. No. 937,674, Dec. 4, 1986, abandoned.

[51] Int. Cl.$^5$ .............................................. C08L 97/00
[52] U.S. Cl. ................................................... 252/311.5
[58] Field of Search ................ 252/311.5, 88; 106/277

[56] References Cited

U.S. PATENT DOCUMENTS

| | | | |
|---|---|---|---|
| 3,923,537 | 12/1975 | Wood | 106/277 |
| 4,021,393 | 5/1977 | McDonald | 106/273 R |
| 4,169,170 | 9/1979 | Doeksen | 106/277 |
| 4,243,563 | 1/1981 | Ferm | 423/561 R |
| 4,293,459 | 10/1981 | Detroit | 106/277 |
| 4,659,374 | 4/1987 | Alanko et al. | 75/3 |
| 4,666,522 | 5/1987 | Hollis, Jr. et al. | 106/277 |
| 4,762,565 | 8/1988 | Graf | 252/311.5 |
| 4,772,647 | 9/1988 | Grassi et al. | 252/311.5 |
| 4,772,648 | 9/1988 | Demangeon et al. | 252/311.5 |

*Primary Examiner*—Catherine S. Kilby Scalzo
*Attorney, Agent, or Firm*—Bielen, Peterson & Lampe

[57] ABSTRACT

Liquid composition for controlling dust migration which comprises an emulsion of liquid asphalt, a ligno-sulfonic acid salt solution and water. The emulsion is spread on a dusty surface to penetrate the same before the emulsion breaks.

19 Claims, No Drawings

LIQUID COMPOSITION FOR CONTROLLING DUST MIGRATION

This is a continuation of application Ser. No. 177,156 filed Apr. 4, 1988, now abandoned and is a continuation-in-part of U.S. application Ser. No. 937,674, filed Dec. 4, 1986.

BACKGROUND OF THE INVENTION

The present invention relates to a liquid composition for controlling or settling dust on a surface such as a roadway.

Many liquids have been employed in the past to prevent the raising of dust on paved roads by vehicles. For example, water, used motor oil, and various lignin sulfonates have been employed. Water, although successfully used to settle dust, is short lived since it easily evaporates in the presence of heat. Used motor oil generally contains contaminants which tend to pollute the water table adjacent to the road surface when used to control dust. Salts of lignosulfonic acid have also been employed to control dust migration on unpaved roadways. Although, the lignosulfonic acids salts bind the dust successfully they are easily washed away by rain.

A composition for semi-permanently controlling the migration of dust would be a great advance in the field of transportation.

SUMMARY OF THE INVENTION

In accordance with the present invention a novel and useful liquid composition for controlling the migration of dust which is especially useful on dusty roads is provided.

The composition of the present invention utilizes three components to form an emulsion. The first component consists of a liquid asphalt which may be considered a slow curing product or a medium curing product under applicable transportation agency standards. The liquid asphalt may consist of a slow curing natural crude oil or slow curing residual oil from crude petroleum or a medium curing asphalt which is fluxed with kerosene. The slow curing products are preferred in certain cases where kerosene is deemed an undesirable component. Slow and medium curing liquid asphalts may be rated as having kinematic viscosities ranging from 70–6000 stokes at 140° F. Such liquid asphalt products are normally sold under the designation S.C. (slow curing) and M.C. (medium curing) followed by a number denoting the low end value of the kinematic viscosity. For example, S.C.—70 is a slow curing liquid asphalt having a kinematic viscosity of generally 70–140 under the AASHTO (American Association of State Highway Transportation Officials) T 201 test method.

The second component is a salt of lignosulfonic acid which originates with wood and is obtained therefrom during the paper manufacturing process. Such salts may be found as sodium and ammonium lignin sulfonate and are sold under the trademark "ORZAN" A, S, G, or LS by Crown Zellerback Corporation Chemical Products Division, Camas, Wash. Generally, the sodium and ammonium lignin sulfonate is formed into a 50% by weight solution with water to form a liquid concentrate. Salts of lignosulfonic acids are very soluble in water and fairly inexpensive in comparison with the asphaltic products heretofore described.

Liquid asphalt and the salt solution of the lignosulfonic acid may be mixed with water, the third component, to form an emulsion by employing an emulsifier and an emulsion mill. Specifically, the emulsion is formed by mixing 10 to 50% of the asphalt liquid with 60 to 10% of a solution of the lignosulfonic acid salt and water in a 50—50 proportion by weight. Also, additional water is added ranging from 30 to 40%. The percentages of the three components above identified are on a volume basis. The liquid asphalt component is heated to 250° F. while the remaining components are fed to the mixture at about 100° F. The resultant mixture passes to a colloid emulsion mill such as a Charlotte model G125 colloid mill manufactured by Chemicolloid Laboratories Inc. of Garden City Park, N.Y. It is believed that the emulsion particles formed are three to five microns in size. The resulting emulsion may be considered a "slow" setting type of emulsion. That is, a substantial period of time is required for the emulsion to "break" or disappear. The emulsion may be stored for several days without reagitation. For ready use, the temperature of the emulsion is maintained at a minimum of approximately 120° F.

An alternate mixture utilizing the present invention consists of 40 to 50 percent by volume of an emulsion formed from 40 to 50 percent by weight of bitumen and 60 to 30 percent by weight of water. The bitumen used was a steam-refined paving asphalt, with an absolute viscosity of 1500–2500 poise at 140° F., under the AASHTO T-20 test method (graded as "AR 2000"). This bitumen-water emulsion may be alternatively employed in the form of a preformed asphalt cement. The bitumen-water is combined with 40 to 50 percent by volume of "ORZAN", prior discussed and as much as 12% additional water.

Application of the emulsion is achieved by transporting the emulsion to the source of the dust, such as a dusty road. The road surface is initially dampened with water followed by distribution of the emulsion on the surface of the road by a conventional spreader apparatus. It has been found that an emulsion employing a 30% by volume portion of the asphaltic liquid in the form of SC-70 may be distributed between two tenths of a gallon to thirty five hundreths of a gallon per square yard. The surface may be employed for vehicular use following treatment with the emulsion within two to twenty four hours, depending on the rate of evaporation of the water from the emulsion. The alternate mixture utilizing the preformed bitument-water emulsion may also be spread at a rate of 0.20 to 0.35 of a gallon per square yard, but this mixture permits light vehicular traffic usage of the surface or roadway within two to four hours, a relatively short time period. It should be noted that these concentrations are substantially less than is required for motor oil used in the prior art.

It is believed that another advantage of forming an emulsion of the heretofore described components permits the liquid asphalt component to greatly penetrate the surface of the roadway. Normally, the application of a liquid asphalt component on a dusty surface would result in such component "plating-out". That is, the liquid asphalt or bitumem components would spread across the surface of the dusty road with very little penetration. After the emulsion of the present invention is employed to bind dust, evaporation of the water causes the emulsion to "break" or loose its state of emulsion. In general, the lignosulfonic acid salt component travels to a lower level relative to the surface of a dusty road and is protected against moisture by the overlying asphaltic liquid layer. In other word, the normally water soluble component lies below the water repellent layer after the emulsion "breaks". Thus, the liquid composition of the present invention is unusually resistant to rainwater deterioration.

The invention is further illustrated by the following examples.

Example 1

An 8000 gallon mixture was formed utilizing a liquid asphalt as a petroleum hydrocarbon purchased under the trademark "SC-70", liquid water, and a liquid solution of ammonium and sodium lignin sulfonate in water purchased under the trademark "ORZAN-50" manufactured by the Crown Zellback Chemical Products Division. The volume percentages and temperatures of the mixture were determined to be as follows.

| Component | Temp °F. | Vol. Percentage |
|---|---|---|
| Liquid Asphalt (Specific Gravity (.89–.99) | 250 | 30 |
| Water | 100 | 30 |
| Solution of 50% ammonium and sodium lignin sulfonate and 50% water by weight (Specific Gravity 1.23–1.28 at 77° C.) | 100 | 40 |

The above mixture was passed through an emulsification mill to form an emulsion at a temperature of at about 160° F. during a (1) hour period. The emulsion was transferred to a 12,000 gallon heated tank and stored for (5) days at about 150° F. After a brief circulation within the storage tank the emulsion was observed to be in-tact.

EXAMPLE 2

The process of Example 1 was repeated with the same mixture components as those enumerated therein except that the following volume percentages and temperatures of the mixture were determined to be as follows:

| Component | Temp | Vol. Percentage |
|---|---|---|
| Liquid Asphalt | 250° F. | 10% |
| Water | 100° F. | 30% |
| Solution of 50% Ammonium and Sodium Lignin Sulfonate and 50% water, by weight | 100° F. | 60% |

EXAMPLE 3

The process of Example 1 was repeated with the mixture components as those enumerated in Example 1, except that the following volume percentages and temperatures of the mixture were determined to be as follows:

| Component | Temp | Vol. Percentage |
|---|---|---|
| Liquid Asphalt | 250° F. | 50% |
| Water | 100° F. | 30% |
| Solution of 50% Ammonium and Sodium Lignin Sulfonate and 50% water by weight. | 100° F. | 20% |

Example 4

An 8000 gallon mixture is formed utilizing a liquid petroleum hydrocarbon (Medium Cure Product) purchased under the trademark "MC-70", liquid water, and a 50—50% liquid solution, by weight, of ammonium and sodium lignin sulfonate and water. The liquid solution is purchased under the trademark "ORZAN-50" and manufactured by the Crown Zellerback Chemical Products Division. The volume percentages and temperatures of the mixture are determined to be as follows:

| Component | Temp °F. | Vol. Percentage |
|---|---|---|
| Liquid Asphalt | 250 | 30 |
| Water | 100 | 30 |
| Solution of 50% ammonium and sodium lignin sulfonate and 50% water (Specific gravity 1.23–1.28 at 77° C.) | 100 | 40 |

Example 5

The emulsion of Example was formed and transferred to a 12,000 gallon storage tank. The emulsion was then pumped within 48 hours to an oil distributor truck with a 14 foot spray bar mounted on the rear end thereof. The emulsion was sprayed on a dusty improved road which had been dampened at a concentration range of about 0.2 gal/yd$^2$ to 0.35 gal/yd$^2$. After evaporation of the water of the emulsion the road appeared darkened and was substantially dust free. A cross-section of the road was examined several days later. It was determined that the emulsion state had disappeared and that the lignosulfonic acid salt had penetrated the unpaved road to a depth approximately ½-¾ of an inch. The liquid asphalt penetrated the unpaved road surface only to a depth of approximately ¼". About (60) days after application of the emulsion and exposure of the unpaved road to several inches of rain, the dry unpaved road was reinspected. Again, the unpaved road appeared darkened and substantially dust free.

Example 6

A 10,560 gallon mixture was formed using, 60% by volume, bitumen CAS number, 8052-42-4; 39%, by volume, water and 1% by volume, a slow setting emulsifying agent sold under the trademark "REDICOT" by Armak Chemicals of Chicago Illinois. The mixture was passed through a colloid emulsion mill to form a anionic emulsion sold under the trademark SS-1 by Morgan Paving Materials of Redding California. A further mixture was formed by combining 10,560 gallons of the anionic emulsion, 10,560 gallons of a solution of 50% ammonium and sodium lignin sulfonate and 50% water (specific gravity 1.23-1.28 at 77° C.) and 5,280 gallons of water. Such further mixture was passed through a colloid emulsion mill to form 24,000 gallons of an emulsion product. The emulsion product was transferred to and remained in storage tanks for (2) weeks. The percentage solid was analyzed from samples taken from the top and the bottom of the storage tanks at the end of the (2) week period. A difference of 2% percentage solids was measured between these samples. An analysis of the emulsification product yielded the following results:

| Component | Percent solids by weight |
|---|---|
| Bitumen | 30 |
| Salts of Ammonium & Sodium Lignin Sulfonate | 19 |
| Emulsifying Agent | 0.2 |

| Component | Percent solids by weight |
|---|---|
| Water content was calculated at 50.8%. | |

Example 7

The emulsion product of Example (6) was transported to a job site, an unpaved U.S. Forest Service road near Happy Camp, Calif. The subject road consisted of crushed native rock of a clay-medi-sediment fineness. Approximately 69 tons of emulsion product was spread over a wetted ten mile length of the subject road; a spread rate of about ¼ gallon per square yard. The emulsion product was observed to "break" and to harden (not tacky to touch) in four hours with an outside air temperature of about 75° F. The "break" coincided with a color change of the spread road surface from brown to black. Light vehicular traffic was permitted after this time. The road supported abnormal vehicular traffic for the next week, when a forest fire erupted in the near vicinity. Such traffic included fire fighting equipment and logging vehicles; the latter transported over 3,000,000 board feet of lumber on the subject road. The roadway was still holding down dust after the forest fire was brought under control, several weeks later.

Example 8

A 1,000 gallon mixture is formed using the following components:

| Component | Vol. in gallons (US) |
|---|---|
| Asphalt Cement | 3436 |
| Solution of 50% ammonium and sodium lignin sulfonate and 50% water, by weight "Orzan" (specific gravity 1.23-1.28 at 77° C.) | 3164 |
| Water | 3377 |
| Emulsifying Agent "Redicote" | 23 |
| Total | 10,000 |

The mixture is passed through an emulsification mill at a rate of 8,000 gallons per hour at a temperature of about 160° F. and passed to a storage tank for future application to a dust surface way.

What is claimed is:

1. A rain resistant liquid composition for controlling dust migration on a traffic bearing surface, comprising: an emulsion breakable when spread on the dust of the traffic bearing surface and subsequently being capable of layered penetration of the dust and of layering the traffic bearing surface said emulsion consisting of:
   a. 10-50% by volume of liquid asphalt;
   b. 60-10% by volume of a solution of 50% by weight of a lignosulfonic acid salt and 50% by weight of water; and
   c. 30-40% by volume of water.

2. The liquid composition of claim 1 in which said lignosulfonic acid salt is selected from one or more members of the group consisting of ammonium lignin sulfonate and sodium lignin sulfonate.

3. The liquid composition of claim 1 in which said liquid asphalt is selected from one or more members of the group consisting essentially of a slow curing natural crude oil and a slow curing residual oil from petroleum, each member of said group possessing a kinematic viscosity ranging from 70 to 6000

4. The liquid composition of claim 2 in which said liquid asphalt is selected from one or more members of the group consisting essentially of a slow curing natural crude oil and a slow curing residual oil from crude petroleum, each member of said group possessing a kinematic viscosity ranging from 70 to 6000 stokes at 140° F.

5. The liquid composition of claim 1 in which said liquid asphalt comprises a medium curing asphalt product blended with kerosene and possessing a kinematic viscosity ranging from 70 to 6000 stokes at 140° F.

6. The liquid composition of claim 2 in which said liquid asphalt comprises a medium curing asphalt product blended with kerosene and possessing a kinematic viscosity ranging from 70 to 6000 stokes at 140° F.

7. A liquid composition for controlling dust migration comprising an emulsion of from 28-32% by volume of a liquid asphalt, from 45-35% by volume of a solution of 50% by weight of a lignosulfonic acid salt and 50% by weight of water, and 27-22% by volume of water.

8. A liquid composition for controlling dust migration comprising an emulsion of 30% by volume of a liquid asphalt, 40% by volume of a solution of 50% by weight of a lignin sulfonic acid salt and 50% by weight of water, and 30% by volume of water.

9. A method of preventing the migration dust comprising the steps of:
   a. providing a liquid emulsion of from 10-50% by volume of a liquid asphalt, from 60-10% by volume of a solution of 50% by weight of a lignosulfonic acid salt and 50% by weight of water, and from 30-40% by volume of water; and
   b. spreading the liquid emulsion on the dust.

10. The method of claim 9 which additionally comprises the step of wetting the dust prior to said step of spreading the liquid emulsion on the dust.

11. A rain resistant liquid composition for controlling dust migration on a traffic bearing surface, comprising:
   an emulsion breakable when spread on the dust of the traffic bearing surface and subsequently being capable of layered penetration of the dust and of layering beneath the traffic bearing surface, said emulsion comprising essentially an emulsion of:
   a. from 40 to 50 percent by volume of an emulsion of from 40 to 50 percent by weight of a bitumen and 60 to 30 percent by weight of water;
   b. from 40 to 50% by volume of a solution of 50% by weight of a lignosulfonic acid salt and 50% by weight of water, and
   c. as much as 12% by volume of additional water.

12. The liquid composition of claim 11, which additionally comprises as much as 3% of an emulsifying agent.

13. The liquid composition of claim 12 in which said emulsifying agent is an anionic emulsifying agent.

14. A rain resistant liquid composition for controlling dust migration on a traffic bearing surface, comprising:
   an emulsion breakable when spread on the dust of the traffic bearing surface and subsequently being capable of penetration of the dust and of layering beneath the traffic bearing surface, said emulsion comprising essentially an emulsion of:
   a. from 42 to 46 percent by volume of an emulsion of from 40 to 50 percent by weight of bitumen and 60 to 30 percent by weight of water;

b. from 42 to 46 percent by volume of a solution of 50% by weight of a lignosulfonic acid salt and 50% by weight of water; and c. from 8 to 12 percent by volume of additional water.

15. The liquid composition of claim 14 which additionally comprises as much as 3% of an anionic emulsifying agent.

16. A rain resistant liquid composition for controlling dust migration on a traffic bearing surface, comprising:
an emulsion breakable when spread on the dust of the traffic bearing surface and subsequently being capable of layered penetration of the dust and of layering beneath the traffic bearing surface, said emulsion comprising essentially an emulsion of:

a. a liquid bitumen from 25 to 35 weight percent solids;

b. lignosulfonic acid salt from 14 to 25 weight percent solids; and

40–61 weight percent water.

17. The liquid composition of claim 16 which additionally comprises as much as 1% by weight of an emulsifying agent.

18. The liquid composition of claim 17 in which said emulsifying agent is an anionic emulsifying agent.

19. A rain resistant liquid composition for controlling dust migration on a traffic bearing surface, comprising
an emulsion breakable when spread on the dust of the traffic bearing surface and subsequently being capable of layered penetration of the dust and of layering beneath the traffic bearing surface, said emulsion consisting of:

a. 48–8% weight percent liquid asphalt;

b. 6–33% weight percent of a lignosulfonic acid salt; and c. 46–59% weight percent of water.

* * * * *